US008774597B2

(12) United States Patent
Fujita et al.

(10) Patent No.: US 8,774,597 B2
(45) Date of Patent: Jul. 8, 2014

(54) INFORMATION PROCESSING APPARATUS, INFORMATION RECORDING MEDIUM, INFORMATION PROCESSING METHOD, AND PROGRAM

(75) Inventors: Shinichi Fujita, Shizuoka (JP); Kenjiro Ueda, Kanagawa (JP); Ryusuke Nishida, Kanagawa (JP); Takashi Matsubara, Shizuoka (JP)

(73) Assignees: Sony Disc & Digital Solutions Inc., Tokyo (JP); Sony Corporation, Tokyo (JP)

( * ) Notice: Subject to any disclaimer, the term of this patent is extended or adjusted under 35 U.S.C. 154(b) by 778 days.

(21) Appl. No.: 12/424,906

(22) Filed: Apr. 16, 2009

(65) Prior Publication Data
US 2009/0279875 A1  Nov. 12, 2009

(30) Foreign Application Priority Data

May 7, 2008  (JP) ................................. 2008-120900

(51) Int. Cl.
*H04N 9/80* (2006.01)

(52) U.S. Cl.
USPC ......................................... 386/248; 386/326

(58) Field of Classification Search
USPC ................................................ 386/248, 326
See application file for complete search history.

(56) References Cited

U.S. PATENT DOCUMENTS

| 2003/0086568 | A1 | 5/2003 | Kato et al. | |
| 2006/0257107 | A1* | 11/2006 | Inokuchi | 386/95 |
| 2008/0013427 | A1* | 1/2008 | Sako et al. | 369/53.21 |
| 2009/0094284 | A1 | 4/2009 | Ueda et al. | |
| 2009/0094321 | A1 | 4/2009 | Ueda et al. | |

FOREIGN PATENT DOCUMENTS

| JP | 2003-16726 | 1/2003 | | |
| JP | 2003-91927 | 3/2003 | | |
| JP | 2003-116100 | 4/2003 | | |
| JP | 2004-46327 | 2/2004 | | |
| JP | 2008-511943 | 4/2008 | | |
| WO | WO 2006024996 | * | 3/2006 | G11B 19/12 |
| WO | WO 2006024996 A2 | * | 3/2006 | G11B 19/12 |

OTHER PUBLICATIONS

Office Action issued Jun. 26, 2012 in Japanese Patent Application No. 2008-120900.

* cited by examiner

*Primary Examiner* — Thai Tran
*Assistant Examiner* — Girumsew Wendmagegn
(74) *Attorney, Agent, or Firm* — Oblon, Spivak, McClelland, Maier & Neustadt, L.L.P.

(57) ABSTRACT

An information processing apparatus includes a playback controller and a storage unit. The playback controller reads per-disc or per-title identification information in the form of a media ID recorded onto a disc, and then executes content playback selection processing or determines a playback processing mode according to bit information included in the media ID. The storage unit stores a program that causes the processing of the playback controller to be executed. By thus using the media ID, provided services, such as the content authorized for playback, can be modified.

9 Claims, 13 Drawing Sheets

FIG. 2

| MEDIA ID BITS | DISC CLASSIFICATION |
|---|---|
| A (000) | RETAIL DISC |
| B (001) | RENTAL DISC |
| C (010) | PROMOTIONAL DISC |
| ⋮ | ⋮ |

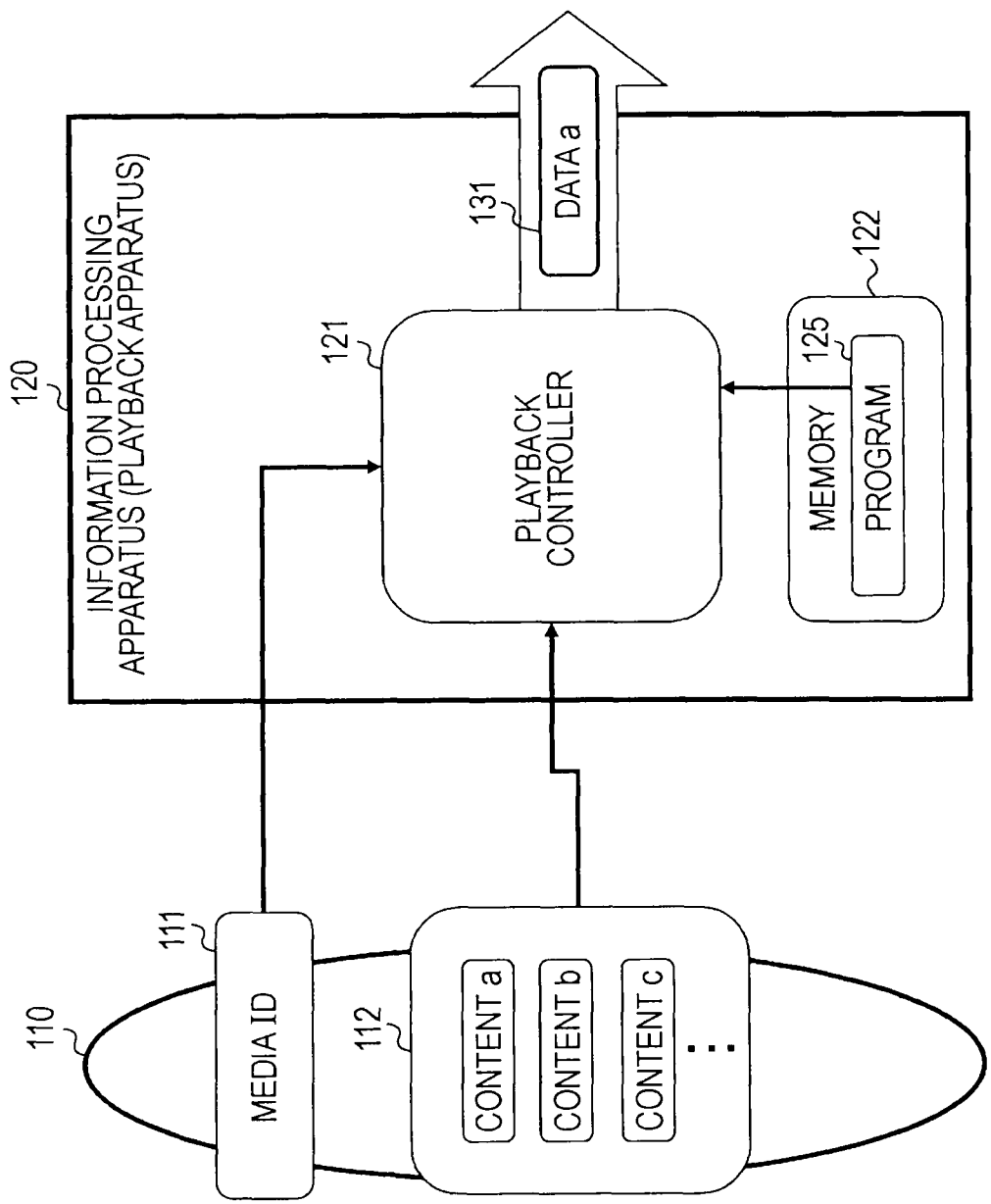

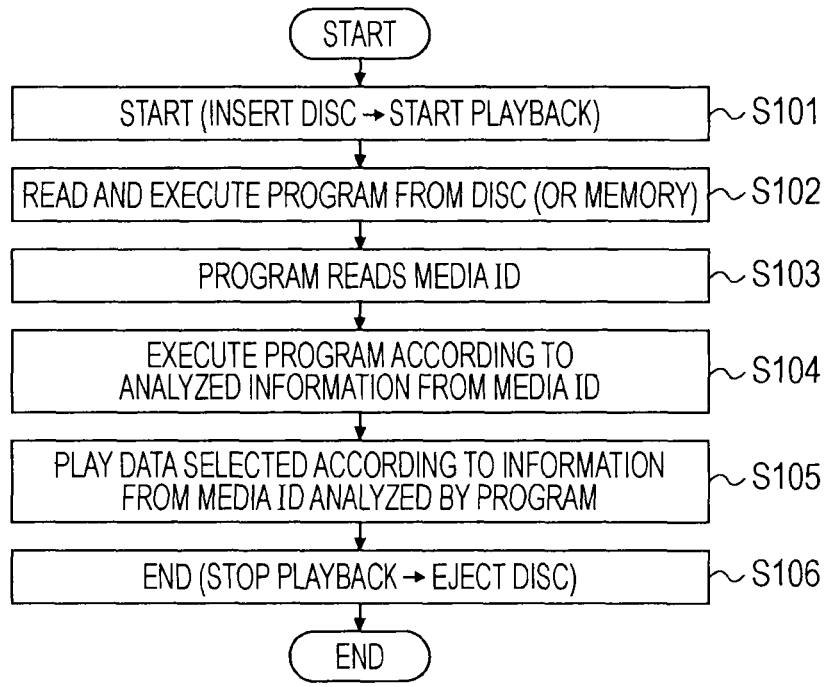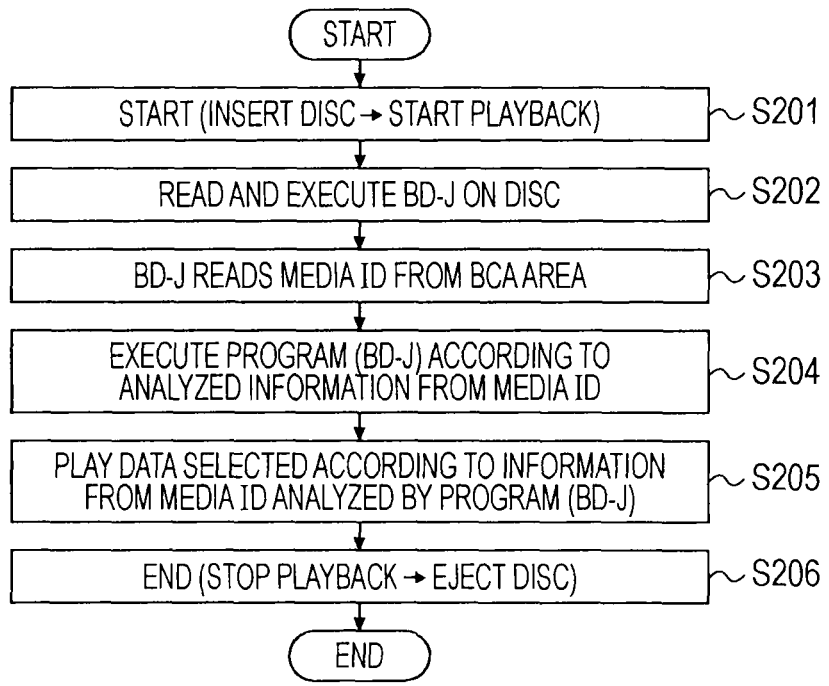

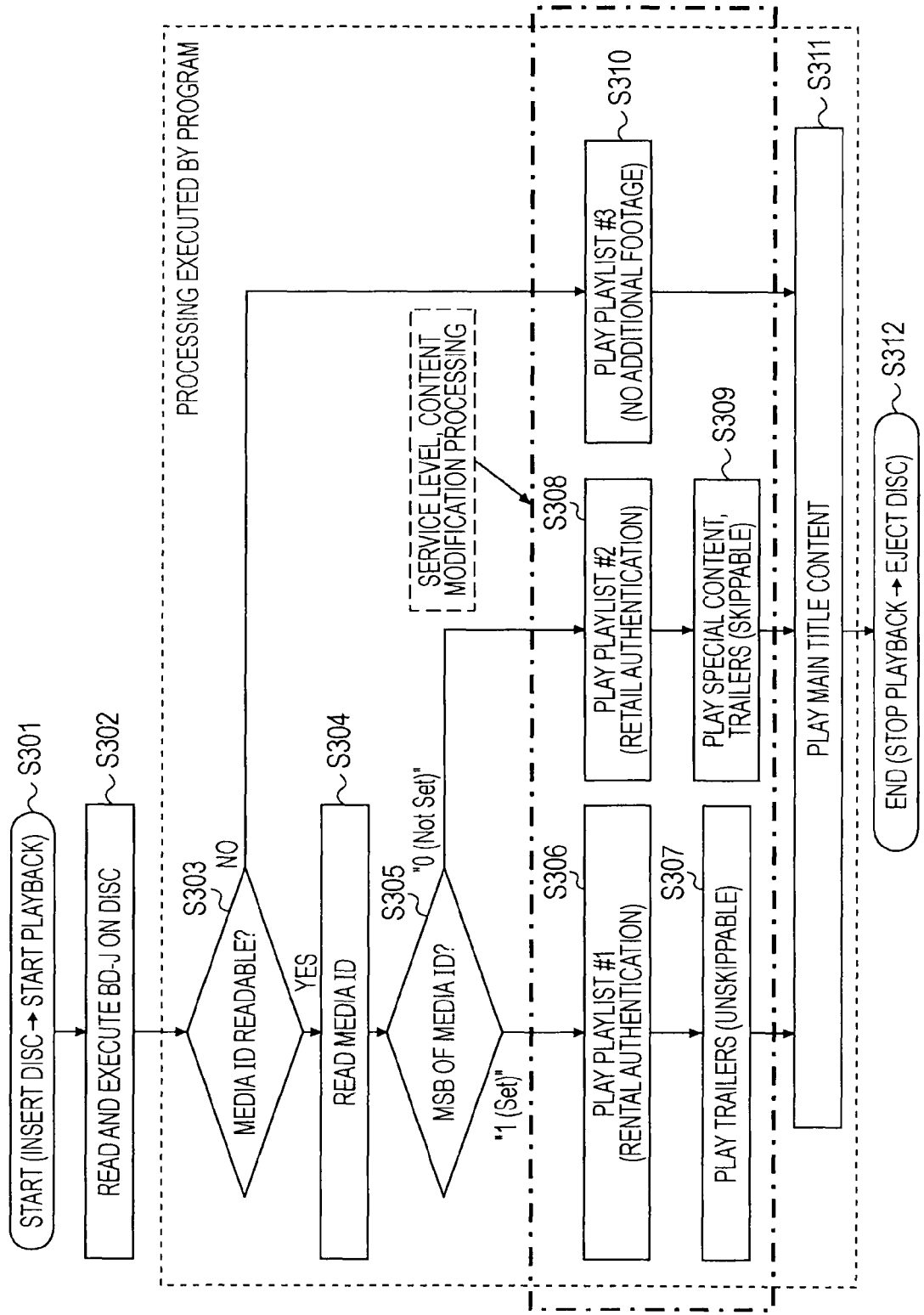

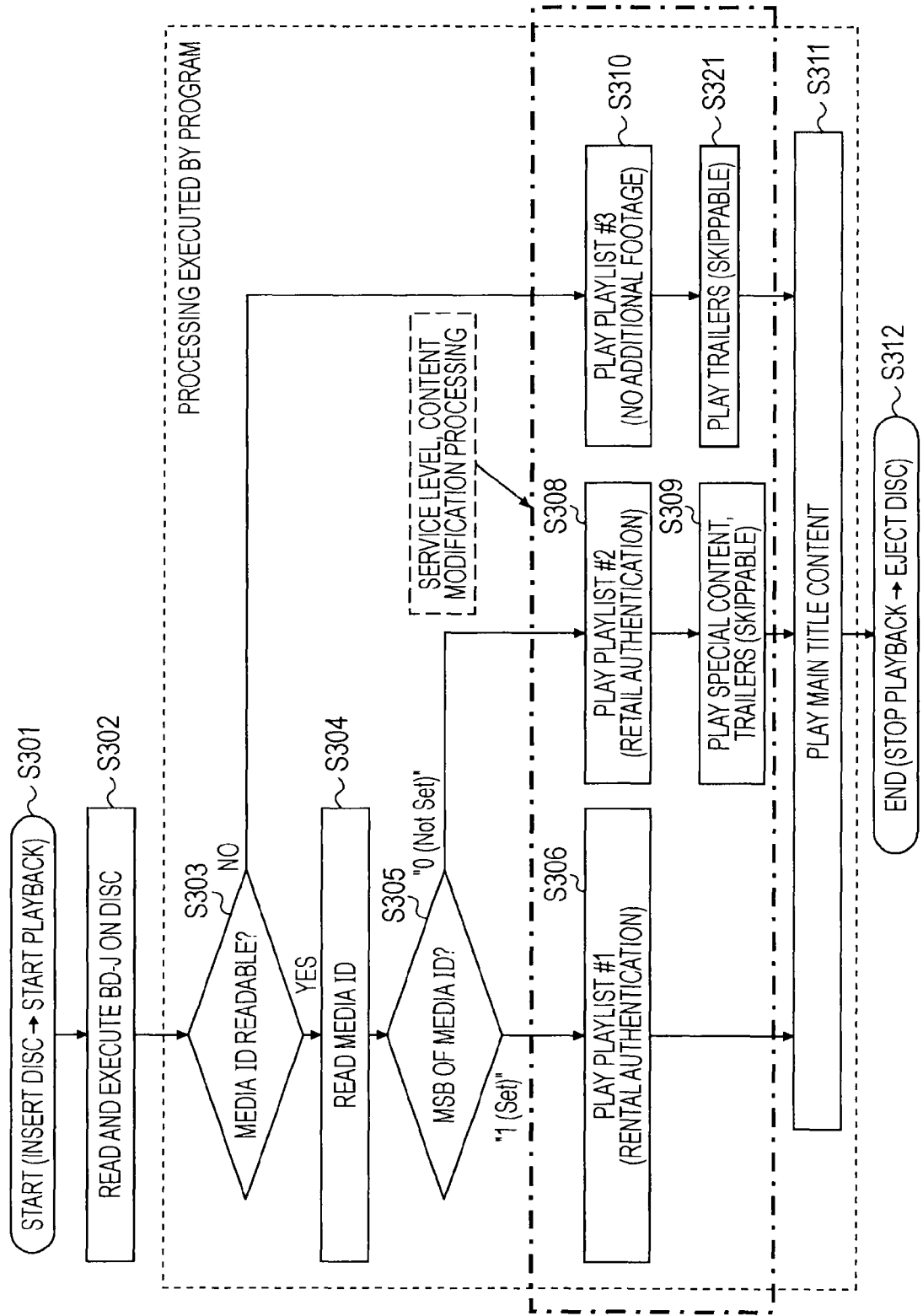

FIG. 12

| PROGRAM EXAMPLE | PROCESS |
|---|---|
| MID = getMediaID (); | READ MEDIA ID |
| if (MID % 10 == 0)<br>    ExePlayList (PlayList#1);<br>else<br>    ExePlayList (PlayList#2); | IF MEDIA ID IS A MULTIPLE OF 10,<br>SELECT AND EXECUTE PLAYLIST #1<br><br>IN ALL OTHER CASES,<br>SELECT AND EXECUTE PLAYLIST #2 |

"MID % 10 == 0" IS COMPUTED REFERENCING
THE UNIQUE VALUE OF THE MEDIA ID

INFORMATION PROCESSING APPARATUS, INFORMATION RECORDING MEDIUM, INFORMATION PROCESSING METHOD, AND PROGRAM

BACKGROUND OF THE INVENTION

1. Field of the Invention

The present invention relates to an information processing apparatus, an information recording medium, an information processing method, and a program. More particularly, the present invention relates to an information processing apparatus, an information recording medium, an information processing method, and a program whereby the usage of content recorded onto an information recording medium is controlled.

2. Description of the Related Art

Various discs such as DVDs (Digital Versatile Discs) and Blu-ray Discs™ are used as recording media for a variety of content, such as movies and music. Much of the content recorded onto such discs is protected by copyright, distribution rights, or other rights held by the content creator or seller. For this reason, usage controls are enacted in order to prevent unauthorized usage.

For example, a control program or system may be used in order to prevent unauthorized copying of content recorded on-disc, or to limit the number of such copies. In addition, a usage control technique may also be used wherein the content is stored on-disc in an encrypted manner, and a key is set such that only users or equipment having proper content usage rights are able to acquire the key. A content usage control configuration using content encryption is disclosed in Japanese Unexamined Patent Application Publication No. 2003-116100, for example.

One standard for content copy protection technology is AACS (Advanced Access Content System). AACS stipulates that a media ID or similar ID information is used when accessing content that has been recorded on-disc. For example, in a playback sequence conducted according to the AACS standard, a playback apparatus into which a disc has been loaded first reads a media ID from the disc, and then executes processing to validate the read ID and generate a key using the ID information, for example. The encrypted content stored on-disc is then decrypted using the generated key, and the content is subsequently played back.

A variety of content usage control schemes like the above have been proposed. However, many of these schemes are either-or controls, and only determine whether or not usage is authorized for the controlled content recorded on-disc. In other words, many schemes distinguish between just two types of users, wherein authorized users are allowed to access all controlled content stored on-disc, while unauthorized users are not allowed to access any controlled content.

In contrast, there are a variety of scenarios whereby a disc storing content might be provided to or used by a user, such as:

(a) usage of content on a disc fully purchased at a retail store;

(b) usage of content on a disc rented via a rental service; and (c) usage of content on a disc distributed to users free of charge as a promotional item.

Content can thus be provided to users by a variety of different routes. If the content stored on such different discs is identical, then the content accessed by an authorized user is identical in all cases, regardless of whether the user purchased the disc, rented the disc, or received the disc free of charge as a promotional item.

In contrast, a content owner who provides content might wish to conduct different usage controls on a per-user basis, such as:

(a) authorizing the main title content of a movie as well as premium content for users who purchased the disc;

(b) authorizing only the main title content of a movie for users renting the disc; and (c) authorizing only trailers of movie content for users whose received a promotional disc.

In order to control usage for different scenarios as above, a method may be used wherein three types of discs with respectively different stored content are manufactured, with a different disc type being used for each provision route. However, the above involves creating three different master discs to be used as masters for manufacturing the three different types of discs, resulting in significant increases in cost.

An alternative method may also be used, wherein the content stored on-disc is identical for all discs, and respective sets of content are encrypted using different encryption keys, with a key being selected according to the user and then provided from a server. In other words, the encryption key for the main title content of a movie, the encryption key for the premium content, and the encryption key for the trailers of movie content are made to respectively differ from each other, and a key that has been selected according to one of the above disc types (a) to (c) are provided from a server.

When executing the above processing, a user apparatus into which a disc has been loaded first transmits the media ID recorded onto that disc to a server. The server subsequently selects a key according to media ID information managed by the server, and then provides the selected key to the user. However, there is a problem with this method in that playback devices not provided with functions for communicating over a network might not be able to acquire a key from the server, and thus might not be able to access the content.

SUMMARY OF THE INVENTION

Being devised in light of the foregoing circumstances, the present invention provides an information processing apparatus, an information recording medium, an information processing method, and a program enabling usage control in a plurality of different scenarios with respect to discs having identical content stored thereon, and without modifying the content stored on-disc.

Also provided are an information processing apparatus, an information recording medium, an information processing method, and a program enabling usage control in a plurality of different scenarios with respect to content stored on-disc, even when using an apparatus that is not provided with functions for connecting to a server or similar communication functions.

An information processing apparatus in accordance with a first embodiment of the present invention includes: a playback controller configured to read per-disc or per-title identification information in the form of a media ID recorded onto a disc, and then execute content playback selection processing or determine a playback processing mode according to bit information included in the media ID; and a storage unit configured to store a program that causes the playback controller to execute the above processing.

In the information processing apparatus in accordance with an embodiment of the present invention, the playback controller may also execute processing to read the program from the disc, and then store the program in the storage unit.

In the information processing apparatus in accordance with an embodiment of the present invention, the playback controller may also determine whether or not the disc is a rental product according to bit information included in the media ID. The playback controller may then execute processing to modify the content for playback depending on whether the disc is determined to be a rental product, or determined to not be a rental product.

In the information processing apparatus in accordance with an embodiment of the present invention, the playback controller may also determine whether or not the media ID is readable, and then execute processing to modify the content for playback in accordance with the determination results.

In the information processing apparatus in accordance with an embodiment of the present invention, the playback controller may also determine whether the disc is a rental product or a retail product according to bit information included in the media ID, and then execute processing to modify the content for playback in accordance with the determination results.

In the information processing apparatus in accordance with an embodiment of the present invention, the playback controller may also execute processing to modify the content for playback by selecting a specific playlist from among a plurality of playlists recorded onto the disc according to bit information included in the media ID.

In the information processing apparatus in accordance with an embodiment of the present invention, the playback controller may also execute content playback selection processing or determine a playback processing mode according to bit information in a specific subset of the bits forming the media ID.

In the information processing apparatus in accordance with an embodiment of the present invention, the playback controller may also execute content playback selection processing or determine a playback processing mode according to the value of a unique value included in the media ID.

In the information processing apparatus in accordance with an embodiment of the present invention, the playback controller may also execute content playback selection processing or determine a playback processing mode according to the results of computations made with respect to the value of a unique value included in the media ID.

An information recording medium in accordance with a second embodiment of the present invention includes content and per-disc or per-title identification information in the form of a media ID recorded thereon. The recording medium is configured so as to enable an information processing apparatus that executes content playback processing to analyze the media ID, and then select content for playback or determine a playback mode according to the analysis results.

In the information recording medium in accordance with an embodiment of the present invention, the information recording medium may also store a program that causes the information processing apparatus that executes content playback processing to execute media ID analysis processing and playback control processing.

An information processing method in accordance with a third embodiment of the present invention executes content playback control processing in an information processing apparatus. The method includes the steps of: causing a playback controller to read per-disc or per-title identification information in the form of a media ID recorded onto a disc; and then causing the playback controller to execute content playback selection processing or determine a playback processing mode according to bit information included in the media ID.

A program in accordance with a fourth embodiment of the present invention causes an information processing apparatus to execute content playback control processing. More specifically, the program causes a playback controller to execute the steps of: reading per-disc or per-title identification information in the form of a media ID recorded onto a disc; and then executing content playback selection processing or determining a playback processing mode according to bit information included in the media ID.

The program in accordance with an embodiment of the present invention may, for example, be provided in a computer-readable format by means of a recording medium or communication medium, and providable to a general-purpose system able to execute various program code. By providing such a program in a computer-readable format, processing is realized on the computer system in accordance with the program.

Further features and advantages of the present invention will become apparent upon reading of the following detailed description in conjunction with the attached drawings. In the present specification, a system refers to the logical assembly of a plurality of apparatus, and is not limited to respective apparatus being housed in a single physical unit.

According to an embodiment of the present invention, an information processing apparatus that executes processing to play back content stored on a disc is made to analyze the bits forming a media ID set on a per-disc or per-title basis and recorded onto the disc. According to the analysis results, content authorized for playback is selected, or a playback sequence is configured. As a result of the above configuration, it becomes possible to analyze a media ID to determine, for example, whether a disc is a rental product or a retail product. Furthermore, it becomes possible to differentiate among discs manufactured using the same master and without modifying the content stored on-disc. For example, it becomes possible to change the content authorized for playback or otherwise differentiate the services to be provided according to the route whereby the disc is provided to a user.

BRIEF DESCRIPTION OF THE DRAWINGS

FIG. 2 is a diagram explaining an exemplary association between bits forming a media ID and disc classifications in accordance with an embodiment of the present invention;

FIG. 3 is a diagram explaining data stored on-disc as well as the configuration of, and exemplary processing executed by, an exemplary information processing apparatus in accordance with an embodiment of the present invention;

FIG. 4 illustrates a flowchart explaining the basic sequence of content usage processing executed by an information processing apparatus in accordance with an embodiment of the present invention;

FIG. 5 illustrates a flowchart explaining the basic sequence of content usage processing executed by an information processing apparatus in accordance with an embodiment of the present invention;

FIG. 6 illustrates a flowchart explaining a content usage processing sequence executed by an information processing apparatus in accordance with an embodiment of the present invention;

FIG. 7 illustrates a flowchart explaining a content usage processing sequence executed by an information processing apparatus in accordance with an embodiment of the present invention;

FIG. 12 is a diagram explaining an exemplary program structure of a content playback control program in accordance with an embodiment of the present invention;

DESCRIPTION OF THE PREFERRED EMBODIMENTS

Hereinafter, an information processing apparatus, an information recording medium, an information processing method, and a program in accordance with embodiments of the present invention will be described in detail and with reference to the accompanying drawings.

An embodiment of the present invention realizes usage control in a plurality of different modes with respect to content stored on a disc such as a DVD (Digital Versatile Disc) or Blu-ray Disc™.

Figure 1:
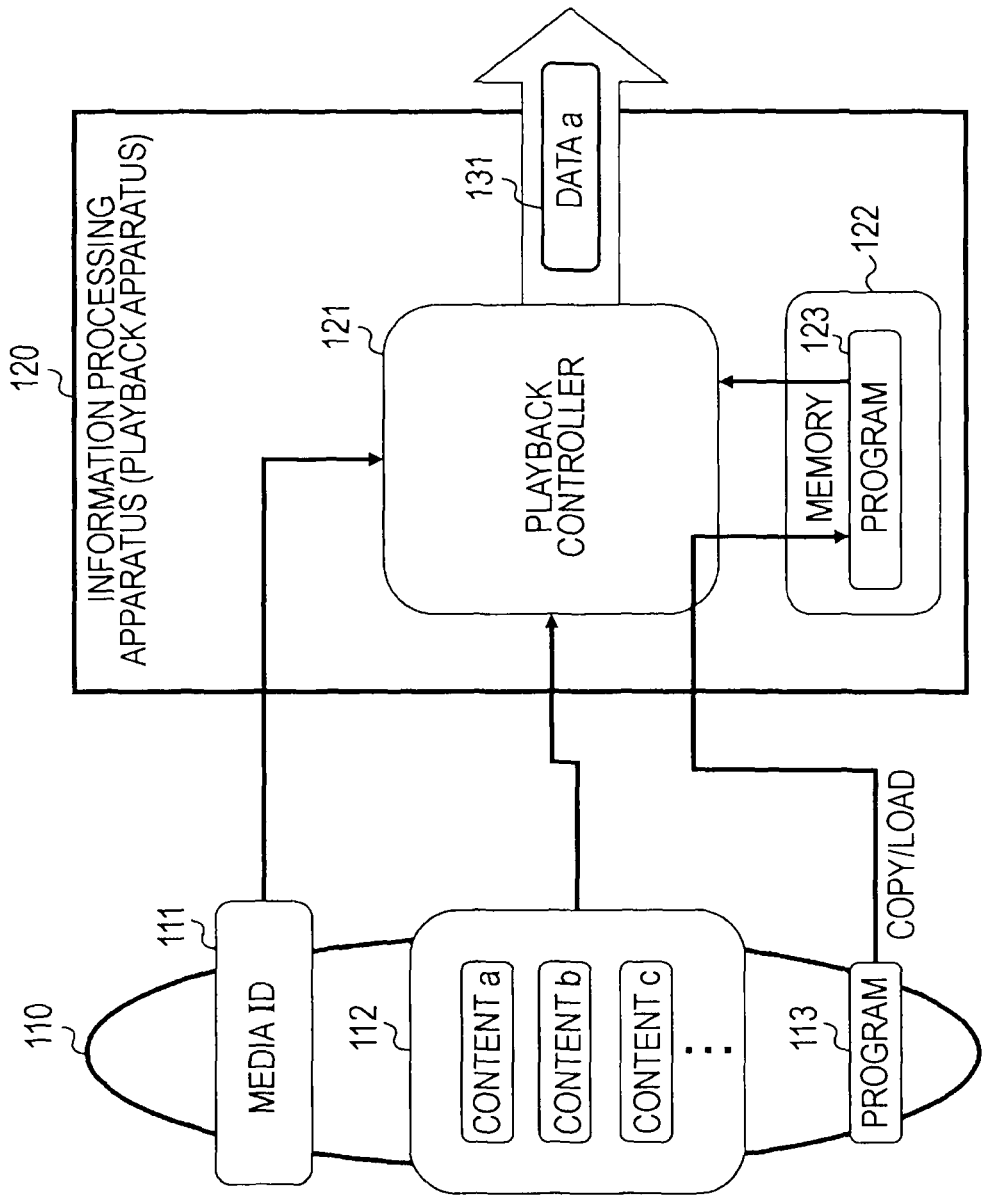
FIG. 1 is a diagram explaining data stored on-disc as well as the configuration of, and exemplary processing executed by, an exemplary information processing apparatus in accordance with an embodiment of the present invention.

An exemplary configuration in accordance with an embodiment of the present invention will now be described with reference to FIG. 1. FIG. 1 illustrates a disc 110 storing content to be provided to a user, as well as an information processing apparatus 120 (i.e., a playback apparatus) that accesses content stored on-disc when the disc 110 is loaded thereinto.

The following data has been recorded onto the disc 110:

(a) disc identification information, in the form of a media ID 111;

(b) content 112, herein divided into a plurality of sets of content a, b, c, . . . ; and (c) a program 113 for playback control processing that is copied or loaded into the information processing apparatus 120 and then executed.

The information processing apparatus 120 includes a playback controller 121 and memory 122. The playback controller 121 conducts playback processing by executing a program 123 recorded in the memory 122, thereby playing back content stored on-disc, such as the content a 131, for example.

Herein, the playback controller 121 also conducts processing to load or copy a program 113 stored on the disc 110. The playback controller 121 then executes playback control using the loaded or copied program, or alternatively, the playback controller 121 executes playback processing using both the loaded or copied program as well as a program stored in the memory 122 in advance.

The media ID 111 stored on the disc 110 is identification information for the disc 110. There are various ways of structuring the media ID 111, and examples thereof will be later described in detail. The media ID may be configured as a specific code specified by the content owner, for example. Alternatively, the media ID may be configured as a unique code corresponding to an identifier that is set differently on a per-disc or per-title basis. The unique code may be managed at the disc manufacturing facility, for example.

The media ID 111 configured for a disc in accordance with an embodiment of the present invention is used in order to determine a mode of usage for the content stored on the disc 110. In other words, the media ID 111 contains information used in order to select content authorized for use, or to determine a playback sequence, for example.

One exemplary way of structuring the media ID 111 involves setting disc-unique identification information that differs on a per-disc basis. The media ID is also preferably recorded as data that has been rendered difficult to falsify or overwrite. For example, the media ID may be recorded in a BCA (Burst Cutting Area) separate from the content storage area on the disc.

In the case where the disc 110 is a Blu-ray Disc™, for example, it is possible to use a BD-J, a Blu-ray Disc™-compatible Java™ program, for the program 113 recorded onto the disc 110.

The information processing apparatus 120 may copy the program 113 recorded on the disc 110, store the program 113 in memory, and then launch the program 123, or the information processing apparatus 120 may directly launch the program 123. In either case, the program 123 is loaded into the memory 122. It should be appreciated that the program 113 on the disc 110 and the program 123 in memory 122 of the information processing apparatus 120 shown in FIG. 1 may be configured to be the same program, or configured such that the program 123 includes the program 113 as well as another program already stored in the memory 122.

In the playback controller 121 of the information processing apparatus 120, the program 123 loaded into the memory 122 is executed, thereby also executing content playback processing. Following the program 123, the playback controller 121 reads the media ID 111 recorded onto the disc 110, analyzes the media ID 111, and then conducts either selection processing to select content for playback, or playback processing to determine a playback sequence or other parameters.

The information used to select authorized content or determine a playback sequence may be set using a portion of the bits forming the media ID 111, for example. FIG. 2 illustrates an example wherein 3 bits of data among the bits forming the media ID are set as identification information for determining the mode of content usage. In this way, it is possible to set specific bits within the media ID (such as the most significant bit, the least significant bit, or a specific range of selected bits, for example) as information for determining the mode of content usage.

The example shown in FIG. 2 illustrates the following exemplary data structures:

A (000)=bit information set with respect to a retail disc;

B (001)=bit information set with respect to a rental disc; and

C (010)=bit information set with respect to a free promotional disc.

It is also possible to configure bit information for various discs in addition to the above, such as discs for a premium edition or a copy-enabled edition, for example.

The program 123 executed by the playback controller 121 of the information processing apparatus 120 shown in FIG. 1 analyzes the media ID to determine the mode of content usage. In other words, the program 123 (i.e., the program 113) may analyze bits like those shown in FIG. 2, for example, and thereby determine whether the current disc is a retail product, a rental product, or other type of product. On the basis of the determination result, the program 123 then executes service branching processing whereby processing is conducted to modify the playback content or output content, and additionally modify the playback sequence, for example. The playback controller 121 then conducts playback processing wherein the mode of content usage has been modified by the above program control.

By configuring a content usage control like the above, it becomes possible to differentiate authorized usages of content with respect to a user and in accordance with the wishes of an overseer of content usage, such as the content rights holder. More specifically, it becomes possible to realize various usage modes that have been differentiated according to the route whereby the disc is provided, such as by rental or retail. As a result of such a configuration, it becomes possible to provide different services that vary according to the set media ID, even in the case where a single master disc is used to manufacture discs storing identical content.

Herein, the information included in the media ID 111 that determines the modes of content usage (A, B, C, . . . ) may be set as independent modes, such as A, B, and C, for example, or the modes may be recorded as a plurality of combinations of modes, such as A+B and A+C. By using such a configuration, it becomes possible to define a variety of combinations of processes and services, and thereby provide diverse services that vary according to the disc provision route or the particular user.

Herein, the content recorded onto the disc 110 and accessed by the information processing apparatus 120 is not limited to content such as movies and music, but instead may include a variety of content, data, and playback control information, such as:
   typical content (video, audio, pictures, etc.);
   playlists determining content playback sequences;
   program files (i.e., executables);
   clip AV streams;
   coupons;
   key information (such as a key applied to decode particular content);
   encrypted data;
   games; and
   ringtones.

For example, various data like the above may be stored in the disc 110. The program 113 is then configured as a program that causes particular data to be selected and accessed according to the media ID 111. As a result of such a configuration, the information processing apparatus 120 becomes able to conduct processing to select specific content as authorized content from among the content stored on-disc, or conduct playback processing following a specific playback sequence.

It should be appreciated that the usage control modes defined by the media ID can be used to configure a variety of parameters, and not simply the selection of content authorized for playback. For example, it is possible to define usage controls like the following according to the structure of the media ID (i.e., A, B, C, . . . ):
   play/skip trailers;
   play/skip bonus content;
   allow/disallow selection of special playlists;
   display/hide special advertisements;
   enable/disable program-based decryption (i.e., conversion to plaintext) of special content when copying;
   display/hide contact information of special support center limited to retail users (i.e., customer service differentiation);
   modify playback content; and
   modify content that can be played back among content made up of a total of n episodes in total (modifiable from one to a plurality of episodes).

In the example shown in FIG. 1, the program that executes playback control processing on the basis of reading the media ID has been recorded onto the disc 110. However, the program may also be provided in a different manner, without being recorded onto the disc 110.

For example, the information processing apparatus 120 may be configured to store a program 125 in the memory 122, as shown in FIG. 3. The program 125 herein is similar to the program 113 stored on the disc 110 described above with reference to FIG. 1. Thus, the program 125 executes playback control processing on the basis of reading the media ID.

In the example shown in FIG. 3, the playback controller 121 of the information processing apparatus 120 uses the program 125 stored in the memory 122 to read and analyze the media ID, and subsequently execute content usage processing according to the analysis results, all without conducting processing to copy or load a program from the disc 110.

A basic sequence of the content usage processing executed by the information processing apparatus 120 will now be described with reference to the flowchart shown in FIG. 4. First, in step S101, a disc is loaded into an information processing apparatus, and instructions are issued for starting playback.

In step S102, a playback control program stored on the disc or in memory is read and executed. Subsequently, in step S103, the program is followed and a media ID is read from the disc. In the following step S104, the program is executed according to information obtained by analyzing the media ID. For example, the above program may be a program whose execution sequence is determined in accordance with the media ID analysis results, wherein the content for playback is selected or a playback sequence is determined by the executed program.

In step S105, the program plays or outputs data (i.e., content) in accordance with the media ID. Alternatively, the program may execute various content usage operations, such as copying. In step S106, processing to stop playback is executed upon termination of content usage, and then the disc may be ejected.

As described earlier, the media ID is preferably recorded as data that has been rendered difficult to falsify or overwrite, and is preferably recorded as such data in a BCA (Burst Cutting Area) separate from the content storage area on the disc, for example.

Data recorded in the BCA is read by a process that is different from the process whereby data is read from the regular content recording area. In the case where the disc 110 is a Blu-ray Disc™, the above process may be executed as part of a BD-J, a Blu-ray Disc™-compatible Java™ program. If the program recorded on-disc is a BD-J, then it is possible to use the BD-J to read the media ID from the BCA.

A content usage processing sequence for the case wherein the media ID is recorded in the BCA will now be described with reference to FIG. 5. First, in step S201, a disc is loaded into an information processing apparatus, and instructions are issued for starting playback.

In step S202, a program (i.e., the BD-J) recorded on the disc is read and executed. Subsequently, in step S203, the program (i.e., the BD-J) is followed and a media ID is read from the disc. In the following step S204, the program (i.e., the BD-J) is executed according to information obtained by analyzing the media ID. For example, the program (i.e., the BD-J) may be a program whose execution sequence is determined in accordance with the media ID analysis results, wherein the content for playback is selected or a playback sequence is determined by the executed program.

In step S205, the program (i.e., the BD-J) plays or outputs data (i.e., content) in accordance with the media ID. Alternatively, the program (i.e., the BD-J) may execute various content usage operations, such as copying. In step S206, processing to stop playback is executed upon termination of content usage, and then the disc may be ejected.

(Exemplary Playback Control Processing Executed According to Media ID Analysis)

Hereinafter, a plurality of examples of specific processing sequences occurring in exemplary playback control processing executed according to media ID analysis in accordance with an embodiment of the present invention will be described with reference to FIG. 6 and subsequent drawings. Hereinafter, the following Processing Examples 1 to 6 will be described:

Processing Example 1: an identification flag set in the most significant bit (MSB) of the media ID is used to determine whether a disc is a "Retail Product", "Rental Product", or "Other", and then services (such as the playback processing mode) are modified accordingly;

Processing Example 2: identification processing similar to that of processing example 1 is conducted, but wherein the applied services have been changed;

Processing Example 3: an identification flag set in a specific bit of the media ID is used to determine whether or not a disc is a "Rental Product", and then services (such as the playback processing mode) are modified accordingly;

Processing Example 4: a per-disc or per-title unique value included in the media ID is used to determine whether a disc is a "Retail Product" or a "Rental Product", and then services (such as the playback processing mode) are modified accordingly;

Processing Example 5: a unique value included in the media ID is used to determine whether a disc is a "Special Edition" or a "Regular Edition", and then services (such as the playback processing mode) are modified accordingly; and Processing Example 6: identification processing similar to that of processing example 5 is conducted, but wherein the applied services have been changed.

Processing Example 1

A processing example will now be described with reference to the flowchart shown in FIG. 6, wherein an identification flag set in the most significant bit (MSB) of the media ID is used to determine whether a disc is a "Retail Product", "Rental Product", or "Other".

First, in step S301, a disc is loaded into an information processing apparatus, and instructions are issued for starting playback. Next, in step S302, the playback controller of the information processing apparatus reads a program (a BD-J, for example) recorded onto the disc. It should be appreciated that the program herein is not limited to being a program read from the disc, and may also be a program stored in memory in the information processing apparatus.

The processing in step S303 and thereafter is executed as a result of the playback controller of the information processing apparatus following the program (a BD-J, for example). First, in step S303, it is determined whether or not the media ID is readable. More specifically, processing may be executed to make a determination by referencing the profile of the playback apparatus, to check whether or not the executed program includes functions for BCA reading, or to check whether or not a media ID has been recorded onto the disc, for example.

If reading the media ID fails, then the process proceeds to step S310. In step S310, the program selects a playlist #3 that is selected in the case where reading the media ID fails. Content playback is then conducted in accordance with the selected playlist.

A playlist is information that has been recorded onto the disc and which specifies the playback of particular content recorded onto the disc. A playlist may, for example, contain information specifying content playback segments. A plurality of playlists (#1, #2, #3, . . . ) are recorded onto the disc, such that the playback content is determined by the selected playlist.

If it is determined in step S303 that reading the media ID fails, then in step S310, the playlist #3 is selected in accordance with the program, and the content specified by the playlist #3 is then played back in step S311. In the present example, the playlist #3 is configured to contain information specifying playback of the main title content, and thus enables playback of the main title content. Upon completion of content playback in step S311, playback is stopped in step S312, and processing is executed to eject the disc, for example. The process is then terminated.

On the other hand, if it is determined in step S303 that the media ID is readable, then the media ID is read in step S304. In step S305, the value of the most significant bit of the media ID is checked.

In the present processing example, the most significant bit is set on the basis of the following distinction:

if the MSB is 0, then the disc is treated as a retail product; and if the MSB is 1, then the disc is treated as a rental product.

If the most significant bit of the media ID is confirmed to be 1 in step S305, then the process proceeds to step S306, and the program selects the playlist #1. The playlist #1 is stated in the program as being the playlist selected in the case where the disc is a rental product.

In the subsequent steps S307 and S311, content playback processing is executed with the playlist #1 applied thereto. In the present example, the playlist #1 is configured to contain information specifying playback of two sets of content: playback of trailers (S307), and playback of the main title content (S311). After playing back trailers in step S307, the main title content is played back in step S311. Upon completion of playback, playback is stopped in step S312, and processing is executed to eject the disc, for example. The process is then terminated.

On the other hand, if the most significant bit of the media ID is confirmed to be 0 in step S305, then the process proceeds to step S308, and the program selects the playlist #2. The playlist #2 is stated in the program as being the playlist selected in the case where the disc is a retail product.

In the subsequent steps S309 and S311, content playback processing is executed with the playlist #2 applied thereto. In the present example, the playlist #2 is configured to contain information specifying playback of two sets of content: playback of special content and trailers (S309), and playback of the main title content (S311). After playing back the special content and trailers in step S309, the main title content is played back in step S311. Upon completion of playback, playback is stopped in step S312, and processing is executed to eject the disc, for example. The process is then terminated.

Herein, a parameter may also be configured such that playback of particular content is skippable or unskippable. For example, the playback of trailers in step S307 may be set to be unskippable, while the special content and trailers in step S309 may be set such that the user is able to select whether or not to play the content. It is thus possible to configure various playback settings by modifying the parameters of the program being executed.

Processing Example 2

A processing example will now be described with reference to the flowchart shown in FIG. 7, wherein identification processing similar to that of processing example 1 is conducted, but wherein the applied services have been changed.

The process flow shown in FIG. 7 differs from the process flow shown in FIG. 6 in that step S307 has been removed, and a step S321 has been newly added.

More specifically, if it is determined in step S303 that reading the media ID fails, then the process proceeds to step S310. In step S310, the program selects the playlist #3 that is selected in the case where reading the media ID fails. Content playback is then conducted in accordance with the selected playlist.

In the present example, the playlist #3 contains information specifying playback of two sets of content: playback of trailers (S321), and playback of the main title content (S311). After playing back trailers in step S321, the main title content is played back in step S311. Upon completion of playback, playback is stopped is step S312, and processing is executed to eject the disc, for example. The process is then terminated.

Alternatively, if the most significant bit of the media ID is confirmed to be 1 in step S305, then the process proceeds to step S306, and the program selects the playlist #1. The playlist #1 is stated in the program as being the playlist selected in the case where the disc is a rental product.

In the subsequent step S311, content playback processing is executed with the playlist #1 applied thereto. In the present example, the playlist #1 contains information specifying playback of just the main title content (S311). In other words, playback of trailers (S307) like that of the processing example 1 in the earlier FIG. 6 is not executed.

As a result of the playback processing to which the playlist #1 has been applied, the main title content is played back in step S311. Upon completion of playback, playback is stopped in step S312, and processing is executed to eject the disc, for example. The process is then terminated. In this way, it is possible to configure a variety of playback sequences.

Processing Example 3

The processing example 3 will now be described, wherein an identification flag set in a specific bit of the media ID is used to determine whether or not a disc is a "Rental Product", and then services (such as the playback processing mode) are modified accordingly.

Figure 8:
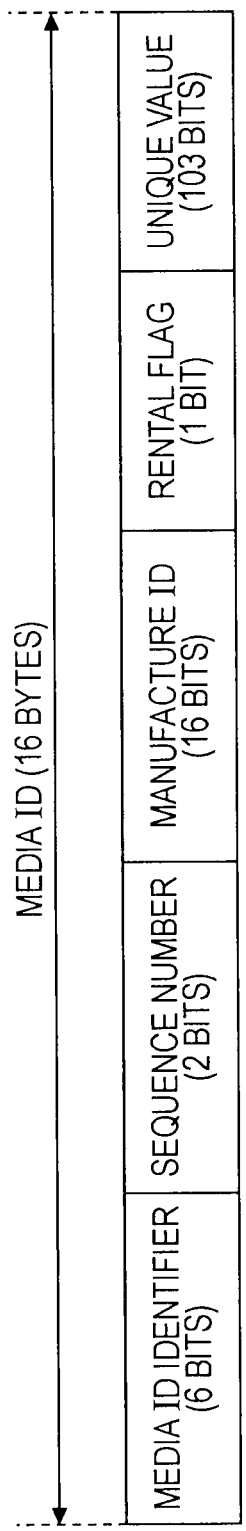
FIG. 8 is a diagram explaining an exemplary data structure of a media ID recorded onto a disc in accordance with an embodiment of the present invention.

For example, the media ID may be recorded onto a disc having a 16 byte structure like that shown in FIG. 8. The media ID includes the following data:
 a media ID identifier (6 bits);
 a sequence number (2 bits);
 a manufacture ID (16 bits);
 a rental flag (1 bit); and
 a unique value (103 bits).

The media ID identifier is an identifier indicating that the present data is the media ID. The sequence number is identification information indicating, for example, the BCA block where the media ID is recorded. For example, if the BCA is configured such that four blocks of 16 B (i.e., 16 bytes) can be recorded thereto, and if 32 B of information is recorded, then two blocks are used to record the information. In this case, each block is recorded with a sequence number such as 00 and 01, for example.

The manufacture ID is the ID of the disc manufacturer. The rental flag is a bit used as an identification flag for indicating whether or not the disc is a rental product. For example, the bit may be written with the following values as an identification flag:
 0 in the case of a retail product; and
 1 in the case of a rental disc.

The unique value is an identifier that differs on a per-disc basis, or alternatively, an identifier that differs on a per-title basis. The unique value may be set and recorded at the disc manufacturing facility, for example.

Figure 9:
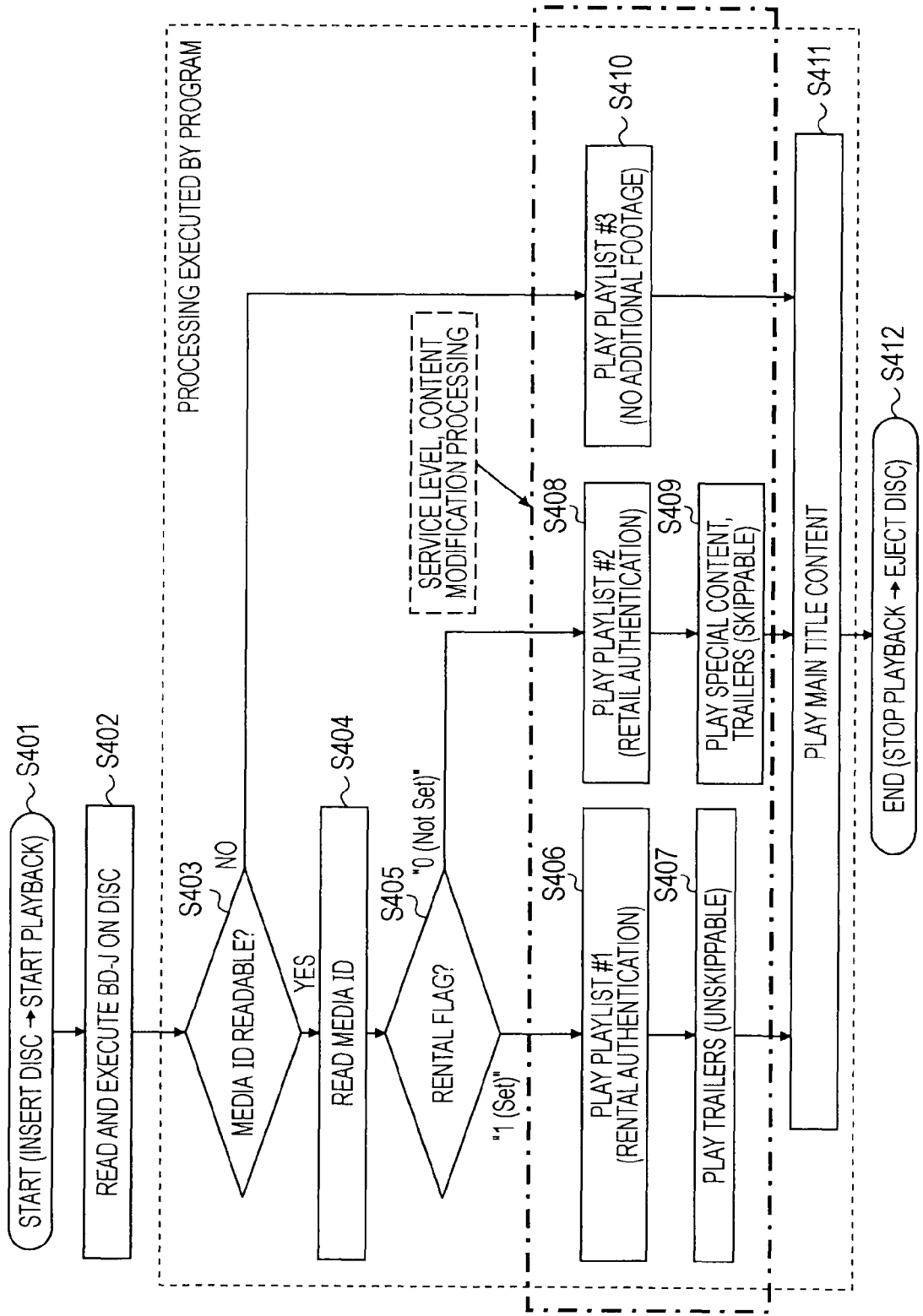
FIG. 9 illustrates a flowchart explaining a content usage processing sequence executed by an information processing apparatus in accordance with an embodiment of the present invention.

A processing sequence will now be described with reference to the flowchart shown in FIG. 9, wherein an identification flag set in a specific bit of the media ID is used to determine whether or not a disc is a "Rental Product", and then services (such as the playback processing mode) are modified accordingly.

First, in step S401, a disc is loaded into an information processing apparatus, and instructions are issued for starting playback. Next, in step S402, the playback controller of the information processing apparatus reads a program (a BD-J, for example) recorded onto the disc. It should be appreciated that the program herein is not limited to being a program read from the disc, and may also be a program stored in memory in the information processing apparatus.

The processing in step S403 and thereafter is executed as a result of the playback controller of the information processing apparatus following the program (a BD-J, for example). First, in step S403, it is determined whether or not the media ID is readable. More specifically, processing may be executed to make a determination by referencing the profile of the playback apparatus, to check whether or not the executed program includes functions for BCA reading, or to check whether or not a media ID has been recorded onto the disc, for example.

If reading the media ID fails, then the process proceeds to step S410. In step S410, the program selects a playlist #3 that is selected in the case where reading the media ID fails. Content playback is then conducted in accordance with the selected playlist.

In the present example, the playlist #3 is configured to contain information specifying playback of the main title content, and thus enables playback of the main title content. Upon completion of content playback in step S411, playback is stopped in step S412, and processing is executed to eject the disc, for example. The process is then terminated.

On the other hand, if it is determined in step S403 that the media ID is readable, then the media ID is read in step S404. In step S405, the configured value of the rental flag contained in the media ID is checked.

In the present processing example, the rental flag is set on the basis of the following distinction:
 if the rental flag is 1, then the disc is a rental product; and
 if the rental flag is 0, then the disc is treated as a retail product, and not a rental product.

If the rental flag contained in the media ID is confirmed to be 1 in step S405, then the process proceeds to step S406, and the program selects the playlist #1. The playlist #1 is stated in the program as being the playlist selected in the case where the disc is a rental product.

In the subsequent steps S407 and S411, content playback processing is executed with the playlist #1 applied thereto. In the present example, the playlist #1 is configured to contain information specifying playback of two sets of content: playback of trailers (S407), and playback of the main title content (S411). After playing back trailers in step S407, the main title content is played back in step S411. Upon completion of playback, playback is stopped in step S412, and processing is executed to eject the disc, for example. The process is then terminated.

On the other hand, if the rental flag contained in the media ID is confirmed to be 0 in step S405, then the process proceeds to step S408, and the program selects the playlist #2. The playlist #2 is stated in the program as being the playlist selected in the case where the disc is a retail product.

In the subsequent steps S409 and S411, content playback processing is executed with the playlist #2 applied thereto. In the present example, the playlist #2 is configured to contain information specifying playback of two sets of content: playback of special content and trailers (S409), and playback of the main title content (S411). After playing back the special content and trailers in step S409, the main title content is played back in step S411. Upon completion of playback, playback is stopped in step S412, and processing is executed to eject the disc, for example. The process is then terminated.

Similarly to the previous processing examples, a parameter may also be configured such that playback of particular content is skippable or unskippable. For example, the playback of trailers in step S407 may be set to be unskippable, while the special content and trailers in step S409 may be set such that the user is able to select whether or not to play the content. It is thus possible to configure various playback settings by modifying the parameters of the program being executed.

Processing Example 4

A processing example will now be described wherein a per-disc or per-title unique value contained in the media ID is used to determine whether a disc is a "Retail Product" or a "Rental Product", and then services (such as the playback processing mode) are modified accordingly.

Figure 10:
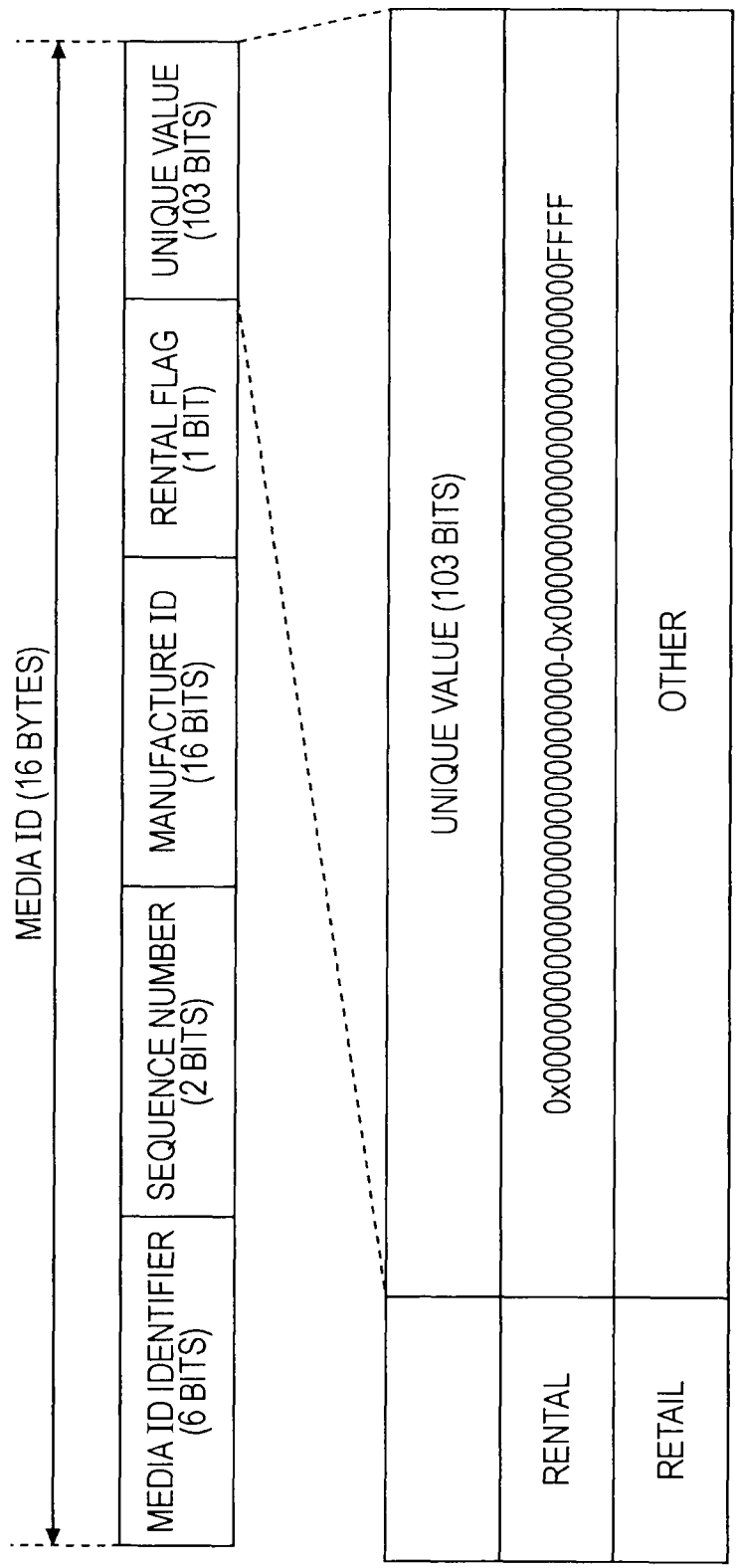
FIG. 10 is a diagram explaining an exemplary data structure of a media ID recorded onto a disc in accordance with an embodiment of the present invention.

An exemplary way to define the media ID in the present processing example will first be described with reference to FIG. 10. FIG. 10 shows an exemplary data structure of a media ID similar to that described with reference to FIG. 8. The media ID includes the following data:
 a media ID identifier (6 bits);
 a sequence number (2 bits);
 a manufacture ID (16 bits);
 a rental flag (1 bit); and
 a unique value (103 bits).

In the present processing example, the unique value contained in the media ID is used as information to determine whether the disc is a "Retail Product" or a "Rental Product".

More specifically, a specific range of unique values are set for rental discs. For example, a unique value in the range of values from 0x00000000000000000000000000 to 0x0000000000000000000000FFFF may be allocated to a rental disc and recorded thereon. Unique values outside the above range are then allocated and recorded onto retail discs.

Figure 11:
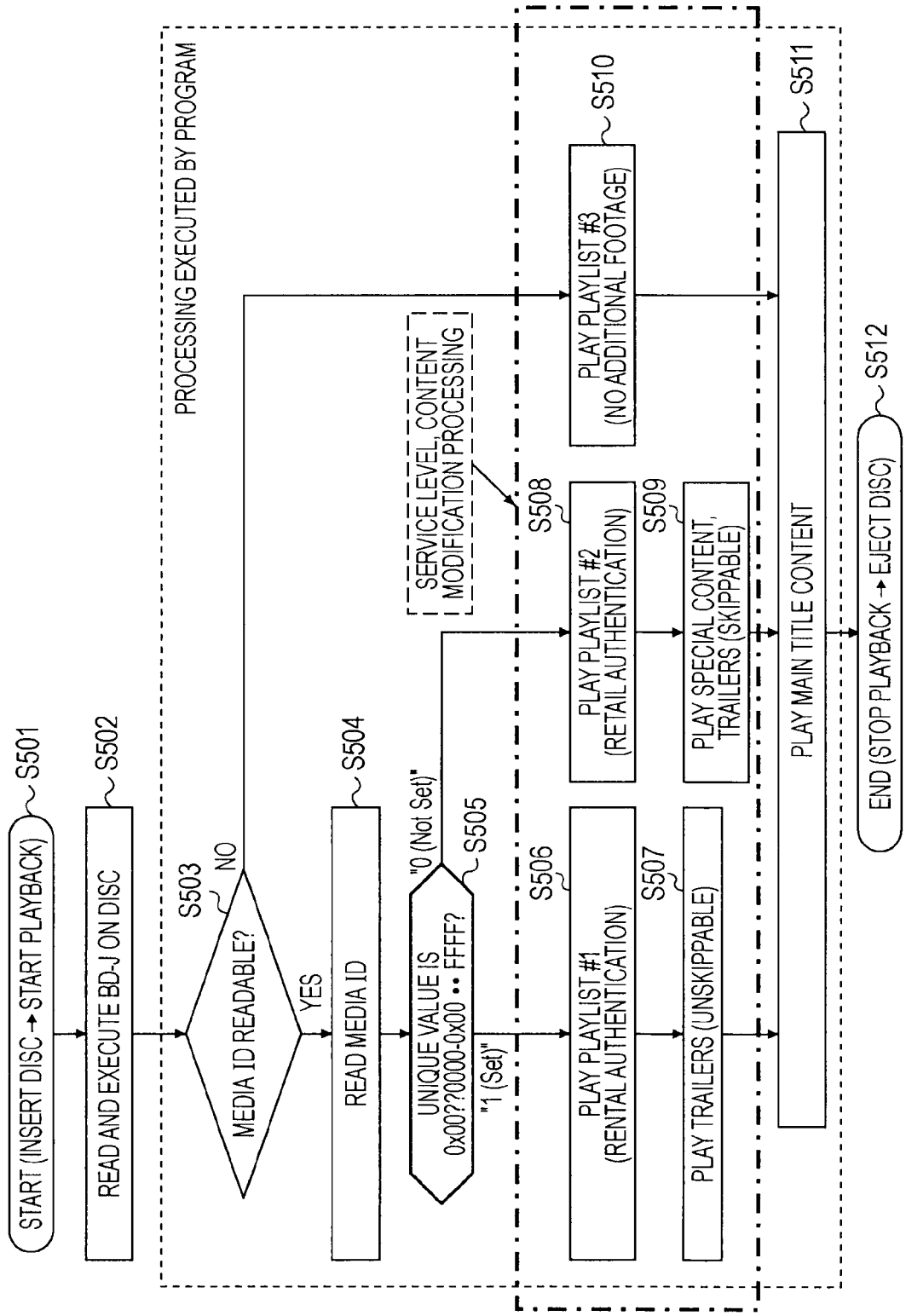
FIG. 11 illustrates a flowchart explaining a content usage processing sequence executed by an information processing apparatus in accordance with an embodiment of the present invention.

A processing sequence will now be described with reference to the flowchart shown in FIG. 11, wherein the unique value of the media ID is used to determine whether or not a disc is a "Rental Product", and then services (such as the playback processing mode) are modified accordingly.

First, in step S501, a disc is loaded into an information processing apparatus, and instructions are issued for starting playback. Next, in step S502, the playback controller of the information processing apparatus reads a program (a BD-J, for example) recorded onto the disc. It should be appreciated that the program herein is not limited to being a program read from the disc, and may also be a program stored in memory in the information processing apparatus.

The processing in step S503 and thereafter is executed as a result of the playback controller of the information processing apparatus following the program (a BD-J, for example). First, in step S503, it is determined whether or not the media ID is readable. More specifically, processing may be executed to make a determination by referencing the profile of the playback apparatus, to check whether or not the executed program includes functions for BCA reading, or to check whether or not a media ID has been recorded onto the disc, for example.

If reading the media ID fails, then the process proceeds to step S510. In step S510, the program selects a playlist #3 that is selected in the case where reading the media ID fails. Content playback is then conducted in accordance with the selected playlist.

In the present example, the playlist #3 is configured to contain information specifying playback of the main title content, and thus enables playback of the main title content. Upon completion of content playback in step S511, playback is stopped in step S512, and processing is executed to eject the disc, for example. The process is then terminated.

On the other hand, if it is determined in step S503 that the media ID is readable, then the media ID is read in step S504. In step S505, the unique value setting contained in the media ID is checked.

In the present processing example, the unique value is set to a value in the range from 0x00000000000000000000000000 to 0x0000000000000000000000FFFF in the case of a rental product, and a value other than the above in the case of a retail product.

If the unique value contained in the media ID is confirmed to be a value corresponding to a rental product in step S505, then the process proceeds to step S506, and the program selects the playlist #1. The playlist #1 is stated in the program as being the playlist selected in the case where the disc is a rental product.

In the subsequent steps S507 and S511, content playback processing is executed with the playlist #1 applied thereto. In the present example, the playlist #1 is configured to contain information specifying playback of two sets of content: playback of trailers (S507), and playback of the main title content (S511). After playing back trailers in step S507, the main title content is played back in step S511. Upon completion of playback, playback is stopped in step S512, and processing is executed to eject the disc, for example. The process is then terminated.

On the other hand, if the unique value contained in the media ID is confirmed to not be a value corresponding to a rental product in step S505, then the process proceeds to step S508, and the program selects the playlist #2. The playlist #2 is stated in the program as being the playlist selected in the case where the disc is a retail product.

In the subsequent steps S509 and S511, content playback processing is executed with the playlist #2 applied thereto. In the present example, the playlist #2 is configured to contain information specifying playback of two sets of content: playback of special content and trailers (S509), and playback of the main title content (S511). After playing back the special content and trailers in step S509, the main title content is played back in step S511. Upon completion of playback, playback is stopped in step S512, and processing is executed to eject the disc, for example. The process is then terminated.

Similarly to the previous processing examples, a parameter may also be configured such that playback of particular content is skippable or unskippable. For example, the playback of trailers in step S507 may be set to be unskippable, while the special content and trailers in step S509 may be set such that the user is able to select whether or not to play the content. It is thus possible to configure various playback settings by modifying the parameters of the program being executed.

Processing Example 5

The processing example 5 will now be described, wherein the unique value contained in the media ID is used to determine whether a disc is a "Special Edition" or a "Regular Edition", and then services (such as the playback processing mode) are modified accordingly.

For example, it is possible to configure parameters such that a "Hit" is recognized when the unique value contained in the media ID is a multiple of 10, thereby allowing the playback of special content. A "Miss" is recognized when the unique value is anything other than a multiple of 10, and playback of the regular content is then allowed.

An exemplary program structure used in the present processing example will now be described with reference to FIG. 12. The program used in the present processing example may be the following program, for example:

```
MID=getMediaID( );
if(MID % 10==0)
    ExePlayList(PlayList#1);
else
    ExePlayList(PlayList#2);
```

The above program causes the following processing to be conducted:
first, read the media ID;
determine whether or not the media ID is divisible by 10 (i.e., the value after dividing by 10 has a remainder of 0);
if divisible, select and execute the playlist #1;
if not divisible, select and execute the playlist #2.

The above processing sequence is included in the program stored on-disc or in memory on the information processing apparatus. By means of the above determination processing, a "Hit" is recognized when the unique value contained in the media ID is a multiple of 10, thereby allowing the playback of special content, whereas a "Miss" is recognized when the unique value is anything other than a multiple of 10, thereby allowing playback of the regular content. It should be appreciated that the determination of whether or not the unique value is a multiple of 10 represents a single example, and that other determination processing may also be conducted. A variety of configurations are applicable to the above determination, such as: processing that makes a determination according to the results of computations made with respect to the unique value; processing that makes a determination on the basis of a set range for the unique value itself, similar to that of the previous processing example; and the determination processing given above, for example.

Figure 13:
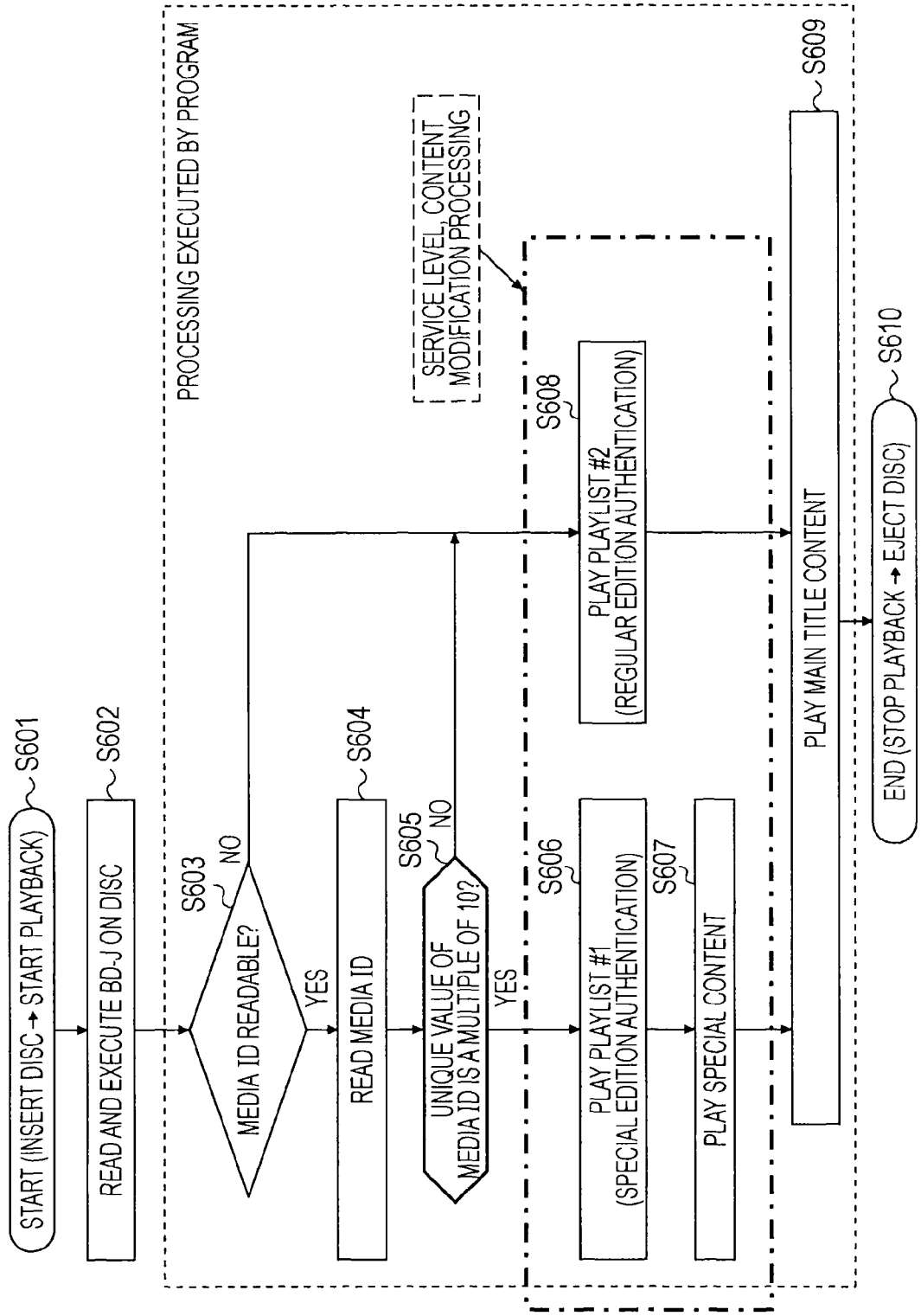
FIG. 13 illustrates a flowchart explaining a content usage processing sequence executed by an information processing apparatus in accordance with an embodiment of the present invention.

A sequence will now be described with reference to the flowchart shown in FIG. 13, whereby processing is executed such that a "Hit" is recognized when the unique value contained in the media ID is a multiple of 10, thereby allowing the playback of special content, and a "Miss" is recognized when the unique value is anything other than a multiple of 10, thereby allowing playback of the regular content.

First, in step S601, a disc is loaded into an information processing apparatus, and instructions are issued for starting playback. Next, in step S602, the playback controller of the information processing apparatus reads a program (a BD-J, for example) recorded onto the disc. It should be appreciated that the program herein is not limited to being a program read from the disc, and may also be a program stored in memory in the information processing apparatus.

The processing in step S603 and thereafter is executed as a result of the playback controller of the information processing apparatus following the program (a BD-J, for example). First, in step S603, it is determined whether or not the media ID is readable. More specifically, processing may be executed to make a determination by referencing the profile of the playback apparatus, to check whether or not the executed program includes functions for BCA reading, or to check whether or not a media ID has been recorded onto the disc, for example.

If reading the media ID fails, then the process proceeds to step S608. In step S608, the program selects a playlist #2 that is selected in the case where reading the media ID fails. Content playback is then conducted in accordance with the selected playlist.

In the present example, the playlist #2 is configured to contain information specifying playback of the main title content, and thus enables playback of the main title content. Upon completion of content playback in step S609, playback is stopped in step S610, and processing is executed to eject the disc, for example. The process is then terminated.

On the other hand, if it is determined in step S603 that the media ID is readable, then the media ID is read in step S604. In step S605, the unique value setting contained in the media ID is checked.

In the present processing example, a "Hit" is recognized when the unique value contained in the media ID is a multiple of 10, thereby allowing the playback of special content, and a "Miss" is recognized when the unique value is anything other than a multiple of 10, thereby allowing playback of the regular content.

If the unique value contained in the media ID is confirmed to be a multiple of 10 in step S605, then the process proceeds to step S606, and the program selects the playlist #1. The playlist #1 is stated in the program as being the playlist selected in the case of a "Hit".

In the subsequent steps S607 and S609, content playback processing is executed with the playlist #1 applied thereto. In the present example, the playlist #1 is configured to contain information specifying playback of two sets of content: playback of special content (S607), and playback of the main title content (S609). After playing back special content in step S607, the main title content is played back in step S609. Upon completion of playback, playback is stopped in step S610, and processing is executed to eject the disc, for example. The process is then terminated.

On the other hand, if the unique value contained in the media ID is confirmed to not be a value corresponding to a multiple of 10 in step S605, then the process proceeds to step S608, and the program selects the playlist #2. The playlist #2 is stated in the program as being the playlist selected in the case of a "Miss".

The playlist #2 is configured to contain information specifying playback of the main title content. Consequently, in this case, playback of the main title content is executed in step S609, without playing back the special content. Upon completion of playback, playback is stopped in step S610, and processing is executed to eject the disc, for example. The process is then terminated.

Processing Example 6

Similarly to the processing example 5, the processing example 6 also uses a unique value included in the media ID to determine whether a disc is a "Special Edition" or a "Regular Edition", and then modifies services (such as the playback processing mode) accordingly. The processing example 5 described with reference to FIG. 13 is configured such that content playback using the same playlist is conducted both when reading the media ID fails, and when reading the media ID is executed but a "Miss" is recognized. In the present processing example 6, the above cases are distinguished, and the playback of different content is conducted.

Figure 14:
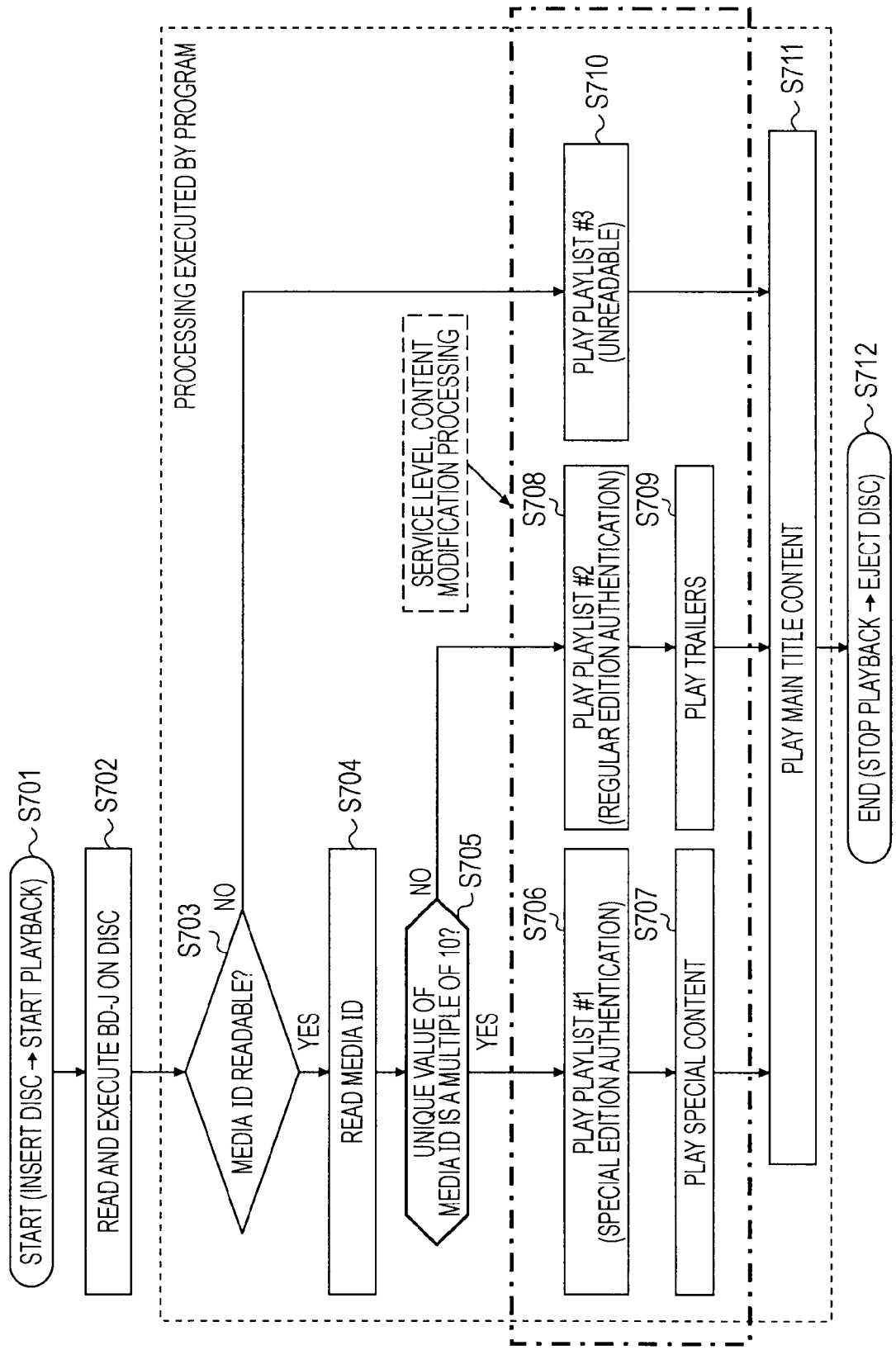
FIG. 14 illustrates a flowchart explaining a content usage processing sequence executed by an information processing apparatus in accordance with an embodiment of the present invention.

A process sequence for the processing example 6 will now be described with reference to the flowchart shown in FIG. 14.

First, in step S701, a disc is loaded into an information processing apparatus, and instructions are issued for starting playback. Next, in step S702, the playback controller of the information processing apparatus reads a program (a BD-J, for example) recorded onto the disc. It should be appreciated that the program herein is not limited to being a program read from the disc, and may also be a program stored in memory in the information processing apparatus.

The processing in step S703 and thereafter is executed as a result of the playback controller of the information processing apparatus following the program (a BD-J, for example). First, in step S703, it is determined whether or not the media ID is readable. More specifically, processing may be executed to make a determination by referencing the profile of the playback apparatus, to check whether or not the executed program includes functions for BCA reading, or to check whether or not a media ID has been recorded onto the disc, for example.

If reading the media ID fails, then the process proceeds to step S710. In step S710, the program selects a playlist #3 that is selected in the case where reading the media ID fails. Content playback is then conducted in accordance with the selected playlist.

In the present example, the playlist #3 is configured to contain information specifying playback of the main title content, and thus enables playback of the main title content. Upon completion of content playback in step S711, playback is stopped in step S712, and processing is executed to eject the disc, for example. The process is then terminated.

On the other hand, if it is determined in step S703 that the media ID is readable, then the media ID is read in step S704. In step S705, the unique value setting contained in the media ID is checked.

In the present processing example, a "Hit" is recognized when the unique value contained in the media ID is a multiple of 10, thereby allowing the playback of special content, and a "Miss" is recognized when the unique value is anything other than a multiple of 10, thereby allowing playback of the regular content.

If the unique value contained in the media ID is confirmed to be a multiple of 10 in step S705, then the process proceeds to step S706, and the program selects the playlist #1. The playlist #1 is stated in the program as being the playlist selected in the case of a "Hit".

In the subsequent steps S707 and S711, content playback processing is executed with the playlist #1 applied thereto. In the present example, the playlist #1 is configured to contain information specifying playback of two sets of content: playback of special content (S707), and playback of the main title content (S711). After playing back special content in step S707, the main title content is played back in step S711. Upon completion of playback, playback is stopped in step S712, and processing is executed to eject the disc, for example. The process is then terminated.

On the other hand, if the unique value contained in the media ID is confirmed to not be a value corresponding to a multiple of 10 in step S705, then the process proceeds to step S708, and the program selects the playlist #2. The playlist #2 is stated in the program as being the playlist selected in the case of a "Miss".

The playlist #2 is configured to contain information specifying playback of the main title content. Consequently, in this case, trailers are played back in step S709 and playback of the main title content is executed in step S711, without playing back the special content. Upon completion of playback, playback is stopped in step S712, and processing is executed to eject the disc, for example. The process is then terminated.

The foregoing thus describes the present invention in detail and with reference to particular embodiments thereof. However, it should be appreciated as obvious to those skilled in the art that modifications and substitutions of the foregoing exemplary embodiments may be made without departing from the spirit and scope of the present invention. In other words, the foregoing discloses the present invention by means of examples, and is not to be interpreted as being limiting. The scope of the present invention is to be determined in conjunction with the attached claims.

In addition, it is possible to execute the series of processes described in the present specification by means of hardware, software, or a compound configuration of both hardware and software. In the case of execution by means of software, a program stating a processing sequence installed and executed in the memory of a computer built into special-purpose hardware. Alternatively, the program may be installed and executed on a general-purpose computer capable of executing various processing. For example, the program may be recorded onto a recording medium in advance and then installed onto a computer. In addition, the program may be received via a network such as a LAN (Local Area Network) or the Internet, and then installed to a recording medium such as an internal hard disk.

It should also be appreciated that the various processes described in the present specification are not limited to being executed in a time series following that described herein, but may also be executed in parallel or individually, depending on the processing capability of the apparatus executing the process or other factors. In addition, in the present specification, a system refers to the logical assembly of a plurality of apparatus, and is not limited to respective apparatus being housed in a single physical unit.

The present application contains subject matter related to that disclosed in Japanese Priority Patent Application JP 2008-120900 filed in the Japan Patent Office on May 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a playback controller configured to read, by executing a program stored in a storage unit, per-disc or per-title identification information in the form of a media ID, separate from the program, recorded on a disc, and then to execute processing to modify content for playback by selecting a playlist from among a plurality of playlists according to bit information included in the media ID, the bit information set in the most significant bit of the media ID or a bit adjacent to a field of the media ID for an ID of the disc manufacturer, wherein
the playback controller executes a content playback selection processing or determines a playback processing mode according to results of computations made with respect to a value included in the twelve least significant bytes of the media ID.

2. The information processing apparatus according to claim 1, wherein the playback controller executes processing to determine whether or not the disc is a rental product according to the bit information included in the media ID, and to modify the content for playback depending on whether the disc is determined to be a rental product, or determined to not be a rental product.

3. The information processing apparatus according to claim 1, wherein the playback controller executes processing to determine whether or not the media ID is readable, and to modify the content for playback in accordance with whether or not the media ID is readable.

4. The information processing apparatus according to claim 1, wherein the playback controller executes processing to determine whether the disc is a rental product or a retail product according to the bit information included in the media ID, and to modify the content for playback in accordance with whether the disc is a rental product or a retail product.

5. The information processing apparatus according to claim 1, wherein the plurality of playlists are recorded onto the disc.

6. The information processing apparatus according to claim 1, wherein the playback controller executes a content playback selection processing or determines a playback processing mode according to a determination whether a value included in the media ID is within a range of values.

7. The information processing apparatus according to claim 1, wherein the playback controller executes processing to read the program from the disc and to store the program in the storage unit.

8. An information processing method, implemented on an information processing apparatus including a playback controller, comprising:
reading, by executing a program stored in a storage unit, per-disc or per-title identification information in the form of a media ID, separate from the program, recorded on a disc;
executing processing to modify content for playback by selecting a playlist from among a plurality of playlists according to bit information included in the media ID, the bit information set in the most significant bit of the media ID or a bit adjacent to a field of the media ID for an ID of the disc manufacturer; and
executing a content playback selection processing or determining a playback processing mode according to results of computations made with respect to a value included in the twelve least significant bytes of the media ID.

9. A non-transitory computer readable storage medium having stored thereon instructions, which when executed by a processor of an information processing apparatus, cause the processor to perform a method comprising:
reading, by executing a program stored in a storage unit, per-disc or per-title identification information in the form of a media ID, separate from the program, recorded on a disc; and
executing processing to modify content for playback by selecting a playlist from among a plurality of playlists according to bit information included in the media ID, the bit information set in the most significant bit of the media ID or a bit adjacent to a field of the media ID for an ID of the disc manufacturer; and
executing a content playback selection processing or determining a playback processing mode according to results of computations made with respect to a value included in the twelve least significant bytes of the media ID.

* * * * *